United States Patent

Rutkowski et al.

[11] Patent Number: 5,851,454
[45] Date of Patent: Dec. 22, 1998

[54] SPINNER HEAD HAVING FLOW RESTRICTING INSERTS

[75] Inventors: William F. Rutkowski, Arlington; Steven E. Frisbee, Reston; Mesfin B. Abdi, Arlington, all of Va.

[73] Assignee: Fuisz Technologies, Ltd., Chantilly, Va.

[21] Appl. No.: 874,215

[22] Filed: Jun. 13, 1997

[51] Int. Cl.⁶ .................................................. B29C 67/00
[52] U.S. Cl. ...................................... 264/8; 425/8; 425/9
[58] Field of Search .................................. 264/8; 425/8, 9

[56] References Cited

U.S. PATENT DOCUMENTS

| | | | |
|---|---|---|---|
| 1,489,342 | 4/1924 | Brent | 425/9 |
| 1,541,378 | 6/1925 | Parcell | 425/9 |
| 3,070,045 | 12/1962 | Bowe | 425/9 |
| 3,073,262 | 1/1963 | Bowe | 425/9 |
| 3,856,443 | 12/1974 | Salvi | 425/9 |
| 3,930,043 | 12/1975 | Warning et al. | 426/515 |
| 4,872,821 | 10/1989 | Weiss | 425/9 |
| 5,427,811 | 6/1995 | Fuisz et al. | 426/465 |
| 5,445,769 | 8/1995 | Rutkowski et al. | 264/8 |
| 5,447,423 | 9/1995 | Fuisz et al. | 425/9 |
| 5,458,823 | 10/1995 | Perkins et al. | 264/8 |
| 5,683,720 | 11/1997 | Myers et al. | 424/489 |

*Primary Examiner*—Mary Lynn Theisen
*Attorney, Agent, or Firm*—Richard D. Schmidt

[57] ABSTRACT

A spinner head is used for spinning and processing feedstock material. The spinner head includes spaced tubular heating elements which are covered by annular housing that forms a material processing wall. The annular housing contains radially spaced slots which provide a passage way for the material to be expelled from the spinner head. Each slot contains a flow restricting insert removably insertable therein. The inserts include radially extending grooves which channel the feedstock material as it exits the spinner head. The insert further include latches extending therefrom which secure the inserts in the spinner head upon rotation.

36 Claims, 10 Drawing Sheets

52'''

52''''

5,851,454

SPINNER HEAD HAVING FLOW RESTRICTING INSERTS

FIELD OF INVENTION

The present invention relates generally to an apparatus for heating and spinning feedstock materials. More particularly, the present invention relates to an improved spinner head having a flow restricting apparatus for producing a desired morphology liquiflash process or flash flow process.

BACKGROUND OF THE INVENTION

Various machines and spinner heads have been devised for the heating and spinning of non-solubilized feedstock materials in order to produce an ultimate spun product having a desired morphology. The feedstock material generally is introduced into the spinning head of the machine in a solid form. The material is processed therein just prior to being expelled from the spinner head where it reforms and re-solidifies having an altered morphology. The materials employed in such processes may include granular sugar, sugar combined with other materials and also non-saccharides. Such spinner heads are used in processing material through a flash flow or liquiflash process.

It has become known to those skilled in the art of material processing, and, especially to artisans familiar with the technology of the owner of the present invention, that "flash flow" refers to conditions of temperature and force required to transform a solid feedstock to a new solid having a different morphology and/or chemical structure in the absence of an extended heat history. Flash flow can be implemented by "flash heat" processing. The term flash heat is understood to mean a process which includes subjecting the feedstock to combinations of temperature, thermal gradients, flow, flow rates and mechanical forces of the type produced in the machines referred to herein. Flash flow processing contemplates transformation of feedstock material substantially immediately upon reaching a flow condition whereby the material can move at a subparticle level. The term "flash flow" is described in the co-owned U.S. Pat. No. 5,427,811 issued Jun. 27, 1995, U.S. Pat. No. 5,236,734 issued Aug. 17, 1993, U.S. Pat. No. 5,238,696 issued Aug. 24, 1993, and U.S. Pat. No. 5,518,730 issued May 21, 1996 the contents of each aforementioned reference are incorporated herein by reference. The ultimate product formed through the flash flow precess includes flakes and floss-type materials.

Liquiflash processing, contemplates the reduction of the feedstock material under conditions of heat and pressure to a condition wherein any resistance to liquid flow, e.g., viscosity which impedes the propensity to form liquid droplets, is eliminated. On a macro scale, this condition appears to provide a liquid or liquiform, which terms are used interchangeably herein. The material processed through a liquid flash process undergoes physical transformation from the initial solid state to a liquid state and then back to the solid state.

With liquiflash processing, once the feedstock is reduced to a condition wherein substantially all resistance to liquid flow is removed, shear force is imparted to the flowing feedstock in an amount sufficient to separate individual or discrete particles from the mass. The particles produced by this separation process, referred to herein as discretization, have a size and shape influenced only by the natural mass separation of the flowing feedstock in the presence of the impinging shear force. The particles thus formed can be referred to as shearlite particles or particulates, e.g., shearform pearls also referred to as microspheres. If the impinging force is such that the separation created is that of a continuous stream, discretization has not occurred and a floss is formed. The liquiflash process and method for making particles therefrom is more fully described in co-pending U.S. application Ser. No. 08/330,412 filed Oct. 28, 1994, now U.S. Pat. No. 5,683,720 which is incorporated by reference herein.

A variety of products may be formed by spinner heads employing one of the above processes including food products and pharmaceuticals. One method of producing substances having pharmacological properties is disclosed in U.S. Pat. No. 4,855,326. This patent discloses combining sugar with a medicament and spinning the combination into a readily water-soluble floss or fiber.

A spinner head which may be employed in producing a variety of reformed spun products, including pharmaceuticals, through the flash flow process is disclosed in U.S. Pat. No. 5,458,823 to Perkins, et al., which is incorporated by reference herein. Perkins, et al. disclose a spinner head having a plurality of discrete closely spaced elongate heating elements disposed between a base and a cover. Feedstock material introduced into the spinner head may be expelled through the spaces formed between the heating elements. In order to more efficiently produce pharmaceutical products, Perkins, et al. further teaches an annular housing assembly formed of heat conductive metal which is inserted over the heating elements. The heating elements, therefore, are isolated from the feedstock material by the annular housing assembly. In order to permit expulsion of feedstock material from the spinner head, the wall of the annular housing includes a plurality of longitudinal radially-directed slots therethrough. The slots are in communication with a central chamber within the spinner head and with the exterior of the spinner head.

The ability to throughly clean a spinner head is especially important in the commercial production of pharmaceutical and food products in order to prevent contamination of the reformed product. Therefore, the use of annular housing assembly in Perkins, et al. is particularly beneficial in the manufacture of spun pharmaceutical product due to its separation of the heating elements from the feedstock material. In many prior art spinner head embodiments, the feedstock material comes in direct contact with the heating elements prior to being expelled from the head. However, during normal operation, the heating elements and surrounding structure become covered in feedstock material which has re-solidified. In order to clean the spinner head to process additional materials, the entire spinner head including the heating elements must be thoroughly cleaned. In the Perkins, et al. device, however, the annular housing assembly constitutes the components which come in contact with the pharmaceutical material, and these components may be easily removed from the spinner head for proper cleaning.

The spinner head of Perkins, et al., is limited in that it is configured to only produce a reformed product of floss like morphology, and it is not easily capable of forming microspheres. Microspheres are a desired reformed morphology especially in the production of pharmaceutical products wherein a medicament is introduced into the feedstock material.

Typically, a spinner head design for producing uniform microspheres through liquiflash processing includes a heater coil wrapped around a processing wall having laser drilled holes as exit ports to permit expulsion of the material. Such a coil wrapped device is disclosed in U.S. patent application Ser. No. 5,445,769. This spinner head design, however, has several inherent design limitations for the mass production of microspheres. The heating coils are wrapped externally on the spinner head, and as such are not isolated from the reformed product. Therefore, the heater coil head is very difficult to clean since solidified feedstock material tends to become trapped by crevices formed between the heater cable and the processing wall. In addition, it is difficult to properly clean the numerous small diametered holes and to verify that they have been sufficiently cleaned.

Furthermore, the laser drilled holes of the heater coil head also impose a limitation since the holes extending through the processing wall are permanently formed. That is once the holes are formed in the processing wall, the size and shape of the holes cannot be altered. Therefore, the material exit opening geometry is fixed. The processing wall opening geometry has been found to be a significant factor in determining reformed product morphology. Therefore, it is desirable to have the design freedom to change the shape and size of the openings in the processing wall to coincide with the desired product.

Accordingly, it is desirable to provide a spinner head which is capable of forming microspheres, among other forms, and which can be easily cleaned and verified as well as allowing for the exit point geometry to be varied as needed.

SUMMARY OF THE INVENTION

The present invention provides a spinner head which includes a base and a cover aligned with and spaced from the base. The spinner head also includes a plurality of discrete elongate spaced apart heating elements positioned between the base and the cover and define a perimetrical configuration. The base, the cover and the heating elements mutually defining a chamber for accommodating therein a solid non-solubilized feedstock material capable of undergoing physical transformation with the application of heat and force. In addition, a flow restricting device is provided for restricting expulsion of the feedstock material from the chamber. The flow restricting device includes a plurality of plates, each plate being removably insertable in a space between the heating elements.

As more specifically described by way of the preferred embodiment herein, the restricting device further includes an elongate generally annular housing having an inside and outside diameter and having a plurality of circumferentially spaced passages extending therethrough. The housing is positionable over the heating elements with the tubular heating elements residing within the passages. The annular housing defines longitudinal radially-directed slots between the passages so as to permit passage of the feedstock material therethrough. One of the restricting plates is insertable in each of the slots and engageable with the feedstock material as it is expelled.

The preferred embodiment of the restricting plate is a substantially elongate plate having a pair of opposed sides including a plurality of radially extending grooves. The grooves forming a pathway for the expelled feedstock material. The grooves extend generally perpendicular to the elongate plate and extend radially outwardly from the spinner head. The grooves are substantially V-shaped in cross-section and have a varying width, the width decreases as the groove extends radially outward. In addition, the plate has a beveled inside edge facing a central chamber in order to assist in channeling feedstock through the grooves. The plate may include a tab extending upwardly from a top portion, in order to provide a gripping area for facilitating removal of the plate from the spinner head.

The plate is secured to the spinner head by a latch member extending substantially orthogonally outwardly from at least one side of the plate and is engageable with the annular processing wall. Upon rotation of the spinner head, the plate is urged radially outwardly by centrifugal force and the latch member is urged against the annular processing wall, thereby preventing the plate from being expelled from the slot.

It is an advantage of the present invention to provide a spinner head having a processing wall capable of producing microspheres through a liquiflash process.

It is a further advantage of the present invention to include a spinner head having flow restricting inserts which are disposed within the processing wall providing a flow path which produces a reformed product having a microsphere morphology.

A further advantage of the present invention a spinner head is provided having flow restricting inserts which can be easily removed from a spinner head, or replaced with inserts having different configurations allowing for the openings of the processing wall to be modified thereby allowing for the production of a wide range of spun product morphologies.

In a further advantage of the present invention to provide a spinner head having flow restricting inserts which can be easily removed from a spinner head allowing for the processing wall to be thoroughly and easily cleaned.

It is still yet a further advantage of the present invention to provide a spinner head having removable inserts which include grooves thereon, the grooves having a tapered V-shaped cross-section through which a feedstock material may flow.

DETAILED DESCRIPTION OF THE PREFERRED EMBODIMENTS

The present invention contemplates a spinner head device for subjecting solid, non-solubilized feedstock material (feedstock) to the sufficient amount of energy in order to physically transform the material to a product having a desired morphology. The energy is transferred to the material by a heat source and through the centrifugal force provided by the spinner head which causes the feedstock material to be expelled from the head at a high velocity. Preferably no external force is imposed upon the feedstock material after it has been expelled from the spinner head other than resistance provided by ambient atmosphere. The feedstock material, so expelled, instantly reforms as a solid having a changed morphology.

The spinner head of the present invention is modifiable to perform either liquiflash processing or flash flow processing, thereby allowing the head to produce a wide range of spun products having a variety of morphologies. A liquiflash process is typically employed when forming microspheres and a flash flow process is typically used to form floss and flakes. In order to configure the spinner head to obtain the desired process, such parameters as temperature, centrifugal force, processing wall and character of the ambient conditions adjacent the spinner head all must be adjusted so that the proper conditions exist. These parameters are must be specifically tailored to the particular feedstock material being processed.

The present invention allows for the material exit openings of the processing wall to be easily modified so that the desired morphology, size and shape, of the reformed product is achieved. It has been found that the shape and length of the openings affect the amount of heat energy and kinetic energy which is imparted to the feedstock material by the spinner head. This flexibility in the processing wall also allows for a variety of materials to be processed with on basic spinner head design.

Furthermore, during operation of the spinner head, the material being processed may tend to adhere to various part of the spinner head including the processing wall through which the material is expelled. This material must be removed when the spinner head is cleaned in order to maintain the head in good working order and to prevent contamination between the various materials processed by the head. The present invention is also unique in its ability to allow for quick and thorough cleaning as well as the production of various reformed morphologies including microspheres.

Figure 1:
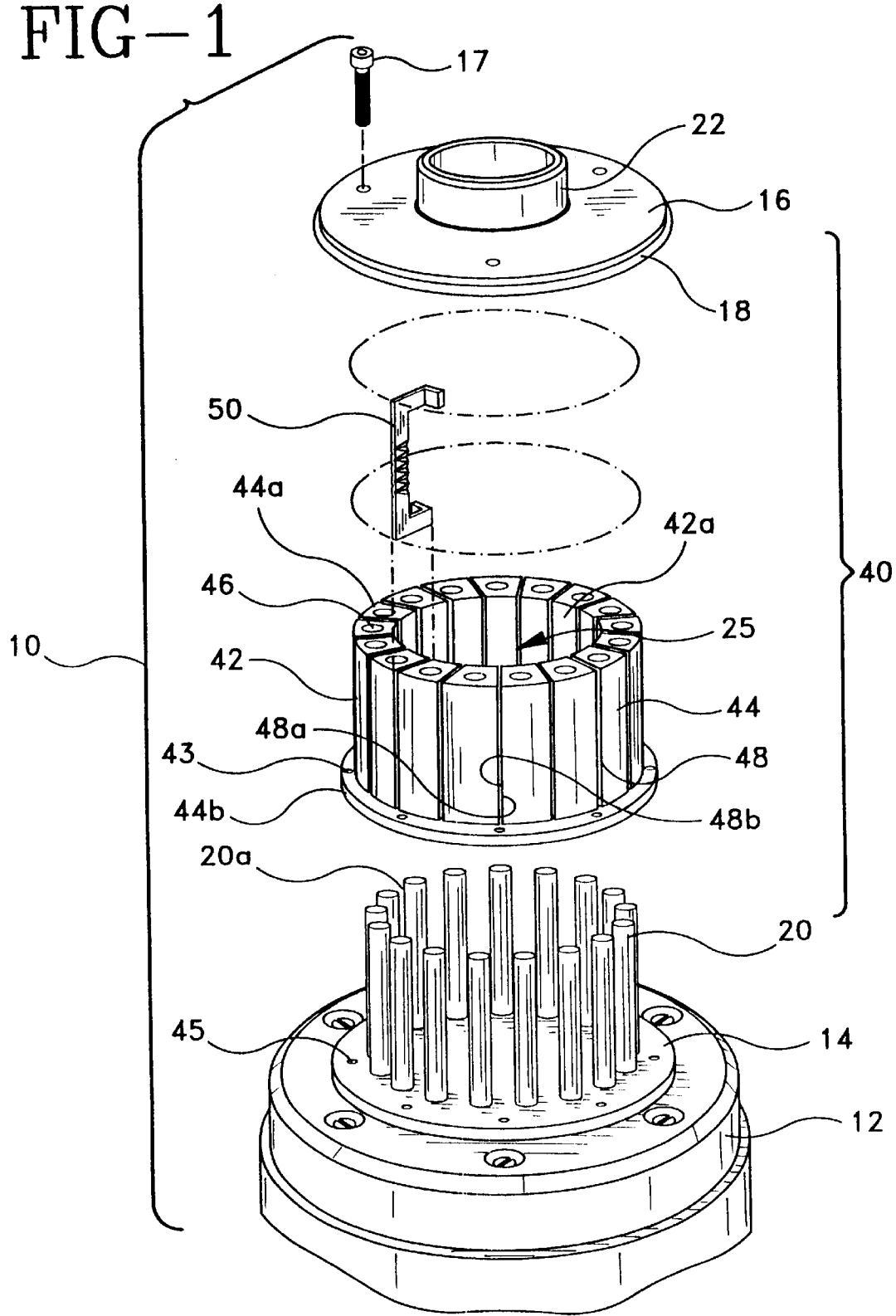
FIG. 1 is an exploded prospective view of a spinner head of the present invention.
Figure 2:
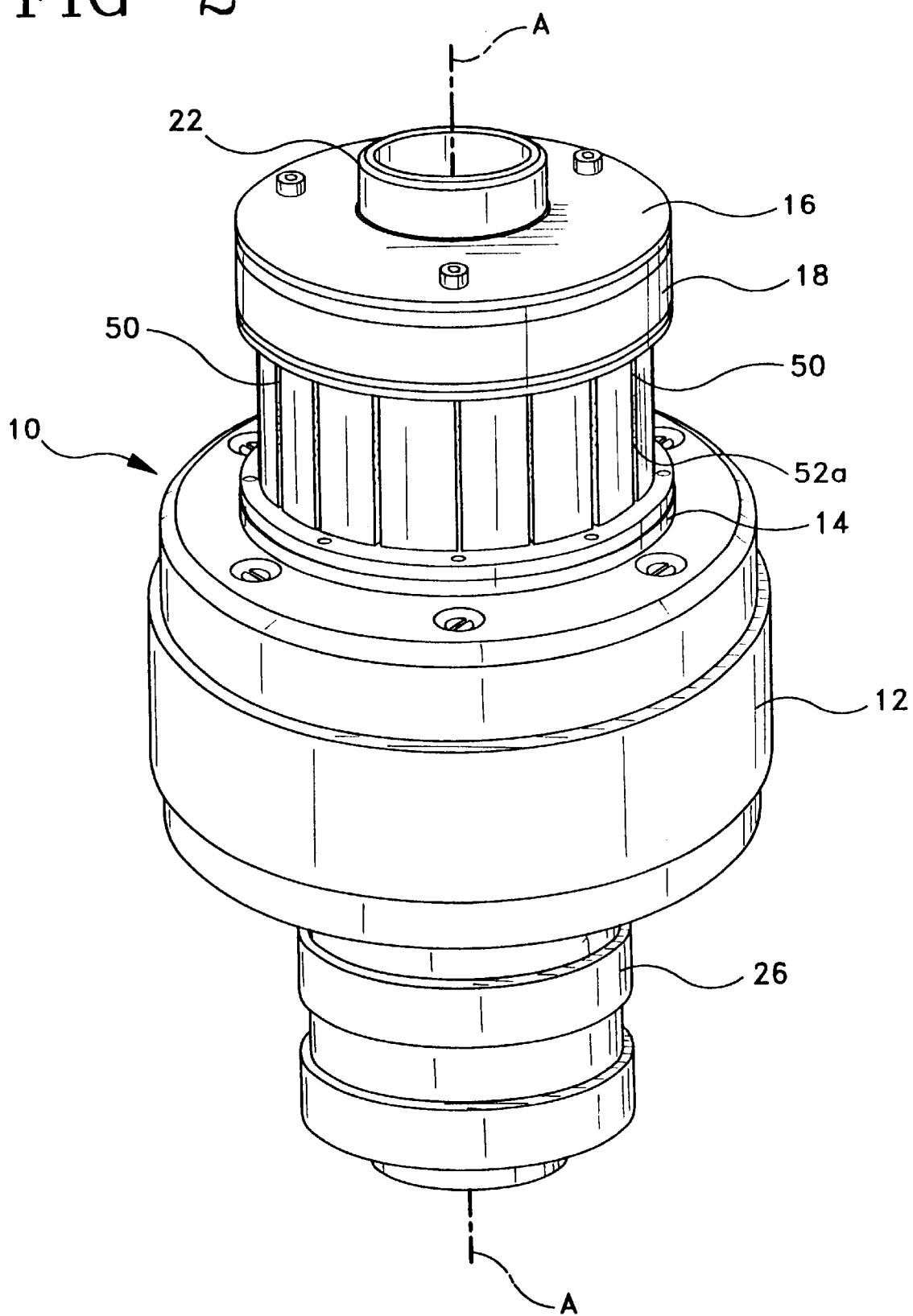
FIG. 2 is a prospective view of the spinner head of FIG. 1.

The spinner head of the present invention will now be described. Referring to FIGS. 1 and 2, the spinner head 10 of the present invention is shown. Spinner head 10 may be used in a manner similar to conventional cotton candy machines to expel feedstock which has been processed in the spinner head into a collection basin or bin (not shown). Use of collection bins in combination with spinner heads to form and collect spun products is well known in the art.

Spinner head 10 includes a generally cylindrical base 12 including a planar bottom insulating ring 14. Spaced above base 12 is a generally cylindrical cover 16 including a planar top insulating ring 18. Appropriate mechanical structure such as bolts 17 may be employed to support cover 16 in spaced relation over base 12. Base 12 and cover 16 may be formed from stainless steel or other suitable material. Insulating rings 14 and 18 are preferably formed from a heat insulative material such as a ceramic or a heat resistant polymer such as polytetrafluoroethylene, (PTFE).

Extending between base 12 and cover 16 are a plurality of tubular heating elements 20 which are arranged in a generally circular array 20a about a central axis of rotation A. Base 12, cover 16 and tubular heating elements 20 form a chamber 25 for accommodating feedstock therein. In order to insert the feedstock into the chamber 25 of spinner head 10, cover 16 includes a generally centrally located opening therethrough which supports a funnel 22 therein. Feedstock may be inserted into chamber 25 through funnel 22. A stem 26 extends centrally downwardly from base 12 and includes an appropriate mechanism (not shown) for permitting the rotation of the spinner head 10 about axis A in a manner which is well known in the art. Base 12 also houses an electrical interface assembly (not shown) therein which powers tubular heating elements The interface assembly has been described in further detail in U.S. Pat. No. 5,458,823 which has been incorporated by reference herein.

Tubular heating elements 20 are generally elongate hollow cylindrical members formed of high watt density heat conductive metal. In a preferred form, tubular heaters may be made from alloy steel tubes. The tubular heating elements 20 may also include a mineral insulated construction having high temperature withstanding capability. Tubular heating elements 20 are positioned in a spaced circular array 20a between base 12 and cover 16. In this manner the tubular heating elements may be used as tie or torsion columns to provide a head structure of unitized strong mass. Tubular heating elements 20 are preferably arranged vertically, that is, perpendicular to base 12 and cover 16, but the tubular heating elements may also be slightly canted. The tubular heating elements 20 may be inserted between cover 16 and base 12 in a force-fitted manner so as to maintain an interference fit under all operating conditions.

The present invention further provides for the controlled uniform application of heat within spinner head 10 by use of tubular heating elements 20. Many of the prior art spinner heads employ heating elements of electrical resistance type. A length of heater wire may be formed or coiled into a desired configuration to be employed in combination with the spinner head. However in many of these prior art designs, the heaters are powered from a single location, thus there is a tendency for the heater to lose heat away from the source of power. Such heat loss prevents uniform application of heat to the feedstock material spun in the spinner head. Further, the ability to provide a high degree of controlled heat is compromised by such designs. Underheating or overheating of the feedstock material within the spinner head caused by non-uniform application of heat, greatly reduces the uniformity and shape of the spun product. The present invention attempts to alleviate such deficiencies by providing individually powered heating elements 20 forming the wall of the spinner head through which the feedstock is processed and expelled. Heat is consequently supplied by the processing barrier more efficiently and predictably. As stated above, the ability to control the amount of heat imparted to the material is very important in controlling the output product. This device and method of controlling the uniform heating of the processing wall is further described in U.S. Pat. No. 5,458,823 which has been incorporated by reference herein.

In order to process the feedstock material and restrict its flow from chamber 25, the preferred embodiment employs an annular housing assembly 40. Annular housing assembly 40 includes an annular housing 42 formed of heat conductive metal and a plurality of flow restricting inserts 50. Annular housing 42 includes an upstanding annular processing wall 44 having a plurality of longitudinal cylindrical passages 46 extending between opposed upper and lower wall surfaces 44a and 44b. The size and location of cylindrical passages 46 are arranged in annular wall 44 to correspond to the size and location of tubular heating elements 20. Annular housing 42 is designed to fit over the array 20a of tubular heating elements 20 shown in FIG. 10, with the individual tubular heating elements 20 being resident within passages 46. Chamber 25 which accommodates the feedstock is defined by the inner cylindrical wall 42a of housing 42. In order to permit expulsion of feedstock material from spinner head 10, the wall 44 of annular housing 42 includes a plurality of longitudinal radially-directed slots 48 therethrough. Slots 48 extend through wall 44 between upper surface 44a and lower surface 44b. Slots 48 are in communication with chamber 25 within spinner head 10 and with the exterior of spinner head 10 to permit expulsion of feedstock material therethrough. Annular housing 42 may further include mounting holes (not shown) on its upper surface which are threadedly engageable with bolts 17 in order to secure top 16. It is also within the contemplation of the present invention that different annular housings having different sized slots may be interchangeably employed on spinner head 10, depending upon various processing parameters.

Annular housing 42 may be secured to base 12 by fastening hardware such as screws (not shown) that extend through apertures 43 on housing lower surface 44b and into threaded holes 45 formed in base 12.

Slots 48 are defined by opposed surfaces 48a and 48b which extend between the inner diameter and outer diameter of wall 44. Since housing 42 is formed of a heat conductive material, the heating of tubular heating elements 20 will cause the heating of housing 42 so as to process the feedstock chamber 25. The processed feedstock is expelled through slots 48 between opposed walls 48a and 48b. The feedstock is in contact with opposed walls 48a and 48b as it is spun from spinner head 10.

As stated above, the ultimate product configuration is influenced in part by the amount of energy imparted on the material. One means of controlling the amount of energy is to regulate the physical characteristics of the of the openings through which the product is expelled from spinner head 10. For example, a longer path length through the heated processing wall will impart more heat to the material than would a shorter path length. The present invention provides for the physical characteristics of the processing wall to be quickly and efficiently modified by use of the flow-restricting inserts 50 which are placed in each of slots 48.

Figure 3:
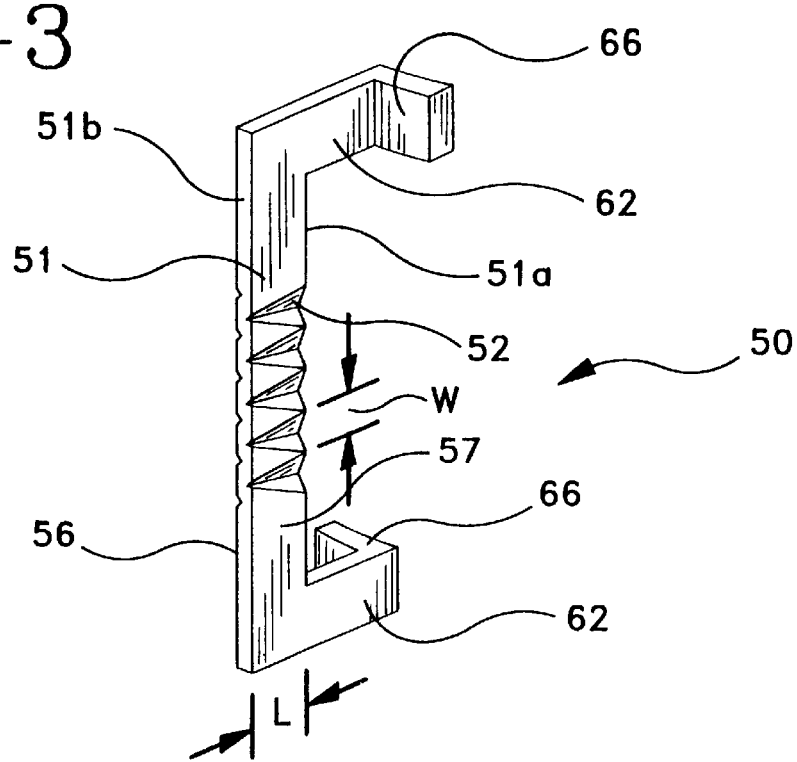
FIG. 3 is a prospective view of the flow restricting insert of FIG. 1.
Figure 4:
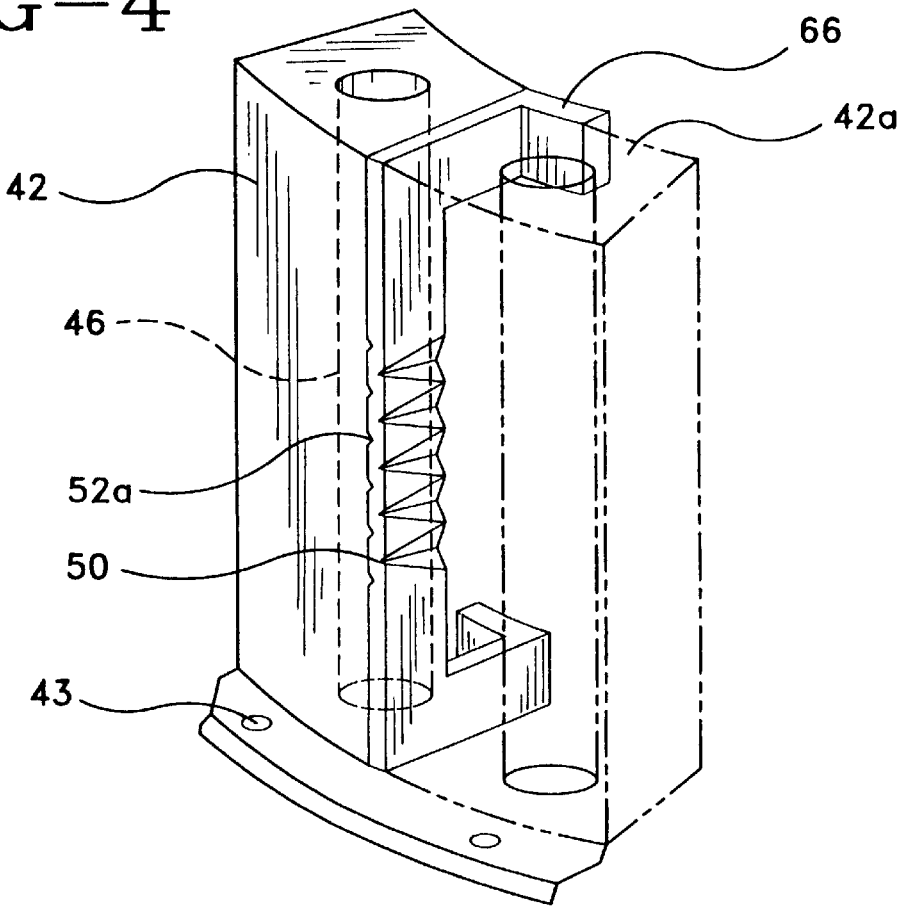
FIG. 4 is a prospective view showing an insert of the present invention inserted in an annular housing shown partially in phantom.

As shown in FIGS. 3 and 4, each flow restricting insert 50 is removably insertable within one of slots 48 and restricts the flow of the material as it passes through the annular processing wall 44. Inserts 50 are similarly formed and are generally elongate plates having a thickness substantially equal to the thickness of their corresponding slots 48 and intimately receivable therein. Inserts 50 are installed in slot 48 with opposed insert side walls 56 and 57 abutting slot side walls 48a and 48b. In order to permit the feedstock to be expelled and create the microsphere morphology, inserts 50 contain radially extending grooves which form a passageway through which the heated feedstock may flow.

Each flow restricting insert 50 includes a grooved portion 51 having a plurality of grooves 52 extending substantially perpendicular to the longitudinal axis of insert 50. Grooves 52 may be located on both side walls 56, 57 of insert 50. Additionally, grooves 52 extend the radial length of insert 50 thereby providing the passage for the feedstock to flow from chamber 25 to outside processing wall 44.

Flow restricting inserts 50 are preferably made of a thermally conducting material so that the heat generated by the tubular heating elements 20 will be conducted through the annular housing 42 which in turn will heat inserts 50 so as to process the feedstock as it flows over inserts 50.

Figure 5:
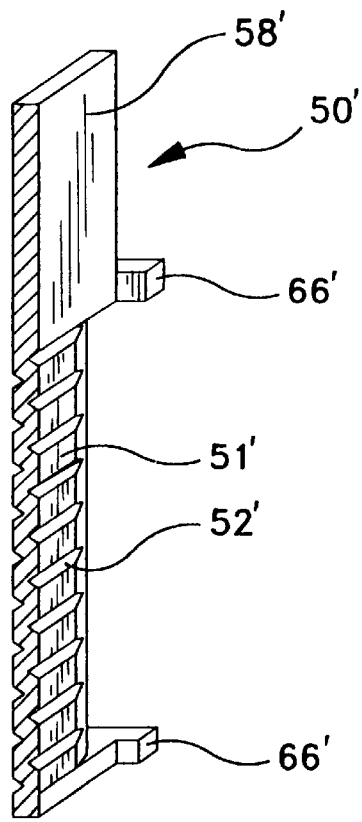
FIG. 5 is a prospective view of an alternative embodiment of the insert of the present invention.
Figures 5A, 5B:
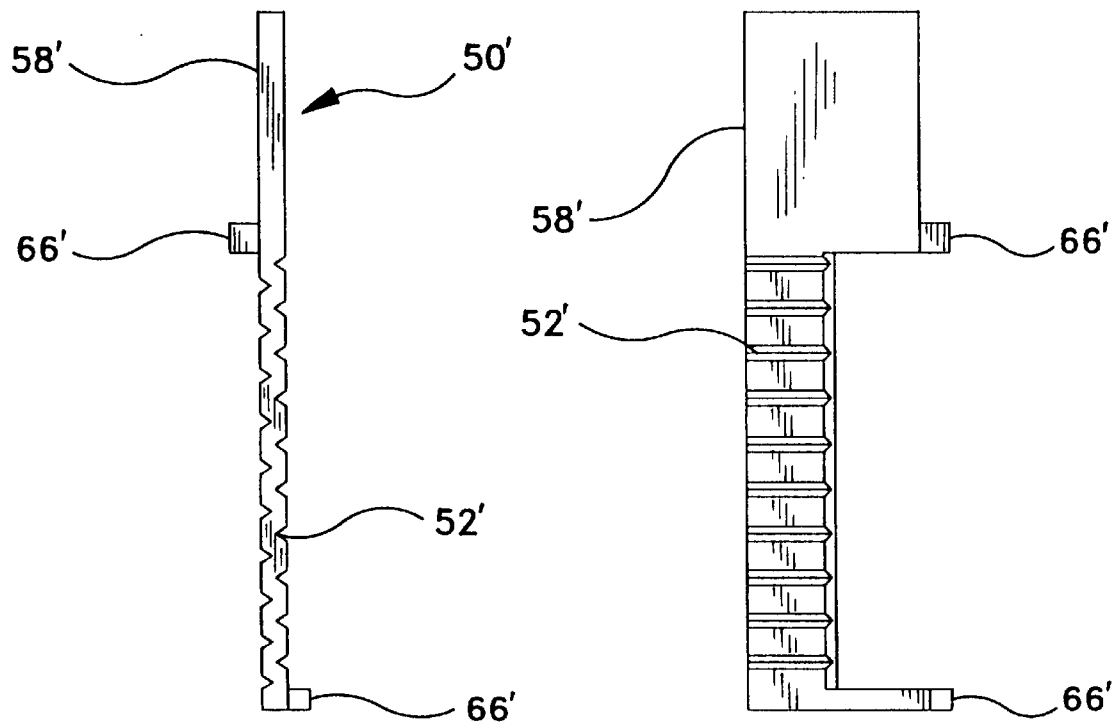
FIG. 5A is an elevational view of the outside edge of the insert of FIG. 5.
FIG. 5B is an elevational side view of the insert of FIG. 5.
Figure 5C:
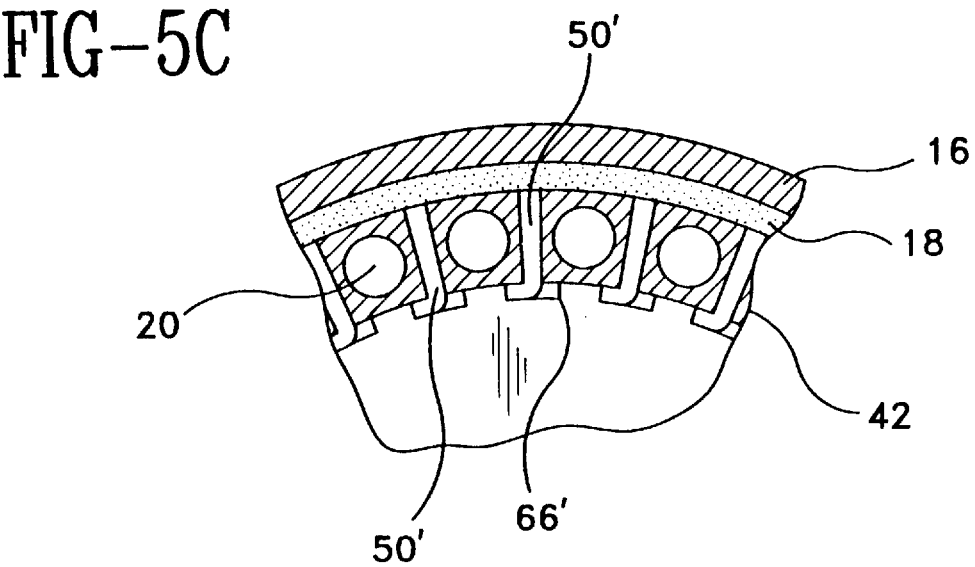
FIG. 5C is a top plan view, partially in section of a portion of the spinner head of the present invention supporting inserts of the type shown in FIG. 5.
Figure 5D:
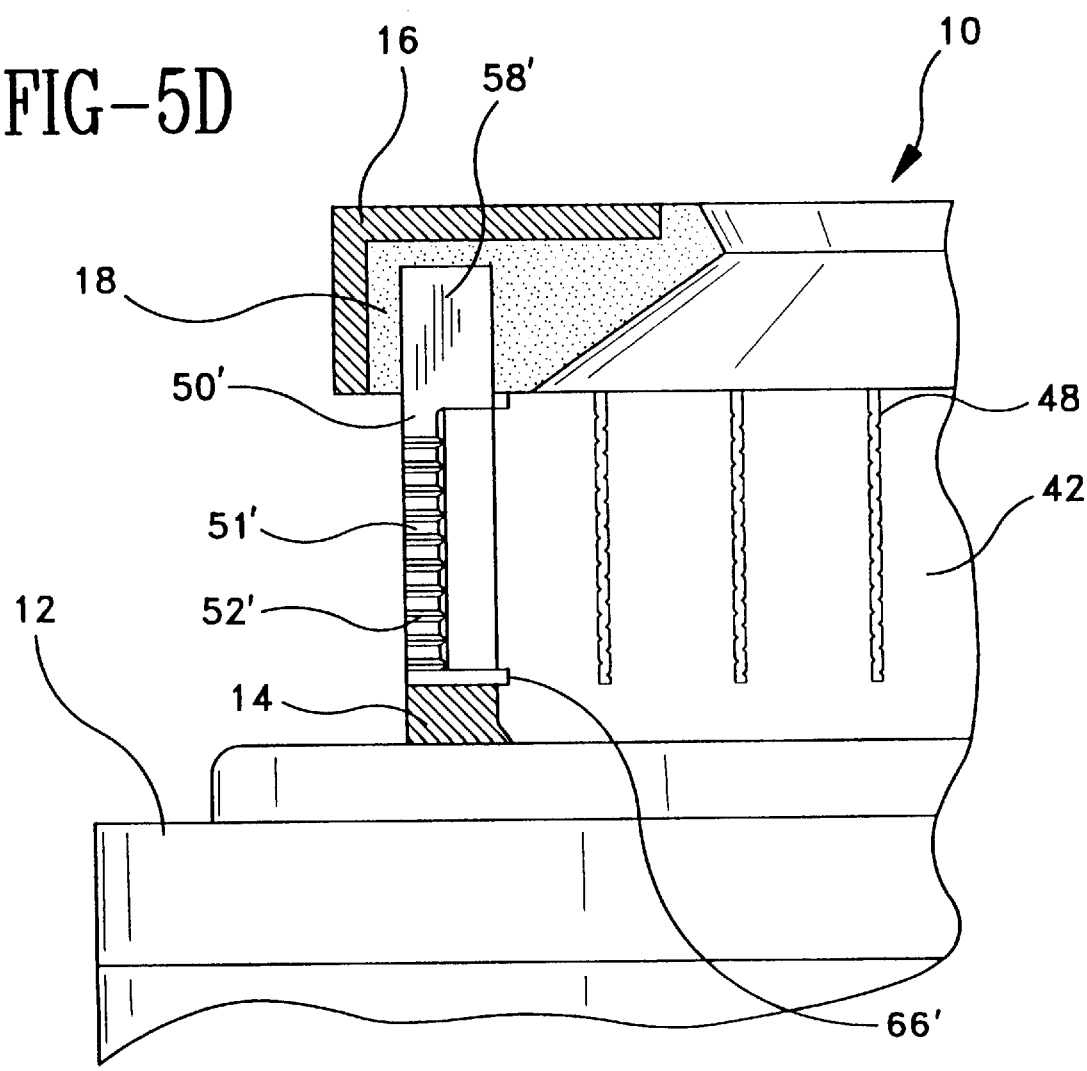
FIG. 5D is a partial side elevational view of the spinner head of FIG. 5C.

Specific embodiments of inserts will now be described. One embodiment of the flow restricting insert is shown in FIGS. 5–5D. Insert grooved portion 51', however, includes a plurality of V-shaped grooves 52' having substantially uniform depth and width throughout their lengths. A groove depth of approximately 0.020 inches has been found to produce desirable results. This groove shape is also preferably employed in the liquiflash process for producing microspheres.

Insert 50' further includes a tab 58' extending upwardly from grooved portion 51". Tab 58' is a substantially planar member and provides a surface for an installer to grip in order to facilitate the insertion and removal of the inserts 50' in and out of slots 48. Tab 58' has a thickness substantially similar to the thickness of the grooved portion 51'. Tabs 58' are dimensioned so that they extend above the annular housing 42. Therefore, tabs 58' may easily be gripped allowing for fast and easy removal of insert 50' from annular housing 42. The cover 16 and insulating ring 18 may include slots (not shown) to accommodate the upwardly extending tabs 58'.

In addition, latch members 66' extend outwardly from both sides of the upper and lower portions of insert 50' in order to secure the insert within slots 48 upon rotation of head 10.

Figure 4A:
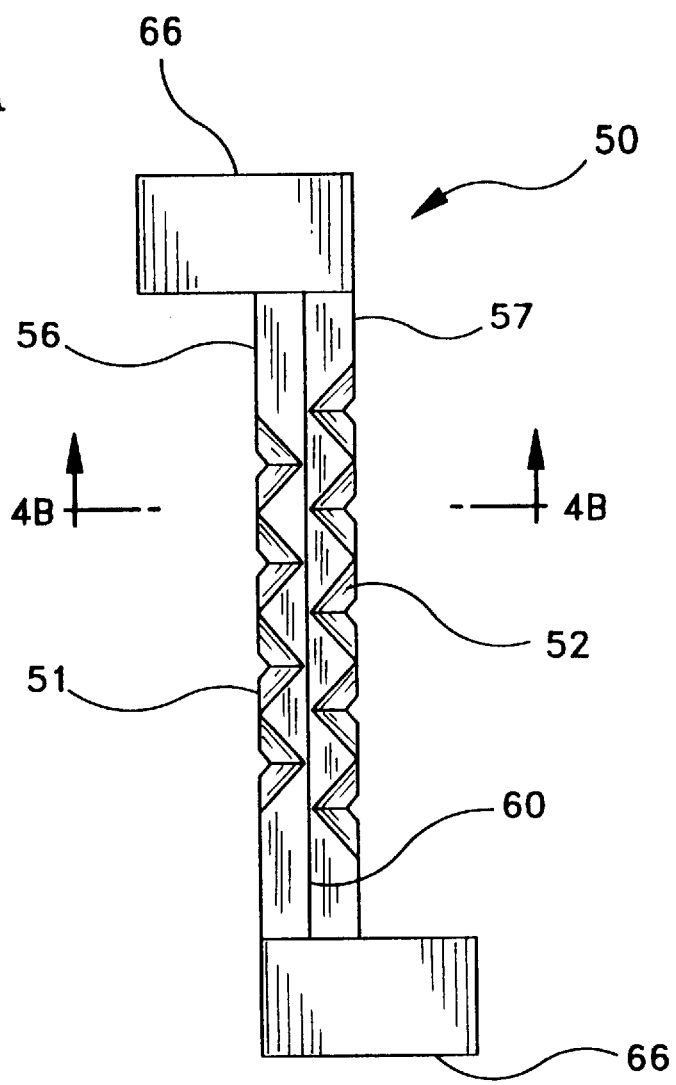
FIG. 4A is an elevational view of the inside edge of the insert of FIG. 3.
Figure 4B:
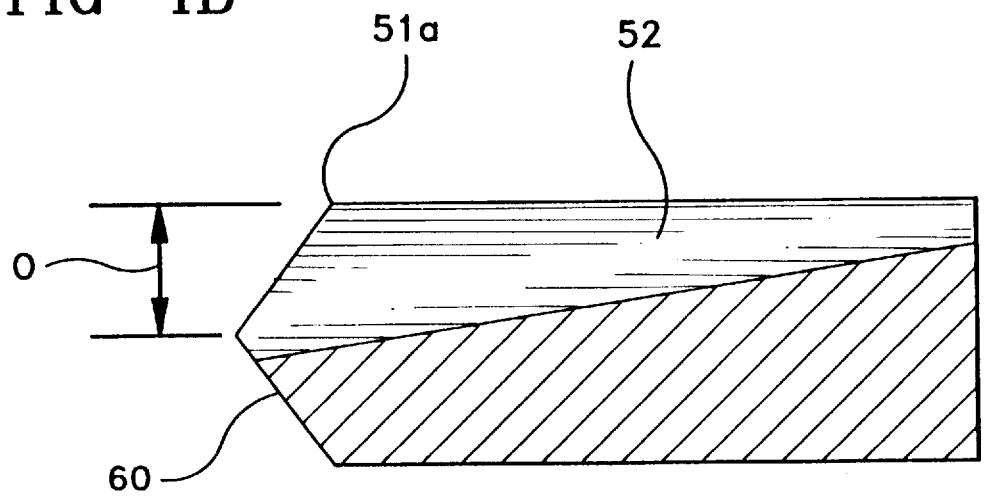
FIG. 4B is a cross-sectional view of the insert of FIG. 4 taken along line 4B—4B.

Turning now to FIGS. 3 and 4–4B, insert 50 includes grooves 52 having another substantially V-shaped cross-section. Insert 50 is preferably used in the liquiflash for the production of microspheres. Grooves 52 have a length, L, approximately one half the radial distance between the outer and inner diameter of annular housing 42 and therefore, grooved portion 51 is similarly sized. In addition, both the depth, D, and width, W, of grooves 52 vary as they extend in the radial direction when insert 50 is installed in head 10. More specifically, both the depth and width decrease as groove 52 extends radially outwardly. The precise length, depth, and width of the grooves may be varied in order to produce a desired characteristic. The variation in depth and width creates a funneling effect which aids in the efficient channeling of material as it exits the spinner head. The flow of the feedstock material is also aided by the inside edge 51a of insert 50 having a V-shaped bevel 60. The beveled inside edge helps direct the flow of molten feedstock material onto both sides of insert 50.

A preferred embodiment may include a varying number of grooves on each side on the inserts. As shown in FIG. 4A, side wall 56 includes 5 grooves and side wall 57 includes 6 grooves. The grooves 52 on one side wall may be offset with respect to the grooves formed on the opposing side wall in order to permit numerous grooves 52 of sufficient depth to be formed on insert 50. In addition, the total number of grooves may be varied as required by the application.

Referring back to FIG. 2, when a flow restricting insert 50 is placed within slot 48, grooves 52 create small V-shaped openings at the points 52a where the material exits spinner head 10. A V-shaped opening is believed to provide a more tightly defined take-off point for the material then a round hole thereby producing a enhanced spun product.

As shown in FIGS. 3 and 4–4B, flow restricting insert 50 further includes a pair of arms 62 extending outwardly from the upper and lower portions of the inside edge 51a of grooved portion 51. An extending latch member 66 is formed on the distal end of each arm 62 and assists in securing insert 50 to head 10 upon rotation thereof. Each latch member 66 extends substantially orthogonally from arm 62 and is engageable with the inside cylindrical wall 42a of annular housing 42 as shown in FIG. 4A. Latch members 66 preferably extend in opposite directions with respect to each other so that both sides of the insert are secured to housing 42.

Upon rotation of head 10, inserts 50 are urged radially outwardly by centrifugal force. This force urges latch members 66 against inside cylindrical wall 42a thereby securing insert 50 within spinner head 10. Inserts 50 are further held in proper position by interference caused by the thermal expansion of the insert and annular wall. As the components are heated, annular housing 42 will expand resulting in slots 48 becoming narrower, and inserts 50 will tend to expand resulting in an increased thickness. Therefore, inserts 50 will be held in place by the interference between the side walls of slots 48 and the side walls 56,57 of inserts 50. This method of securing inserts 50 allows for easy installation and removal of the inserts in and out of spinner head 10 since no securing hardware or clasps need be removed. To install inserts 50, an individual may simply slide the inserts into slots 48 from the upper portion of the annular wall until it is fully seated in slot 48 as shown in FIG. 4. Inserts 50 may also be easily removed by simply sliding the inserts out of slots 48 once the components have cooled.

Figure 6:
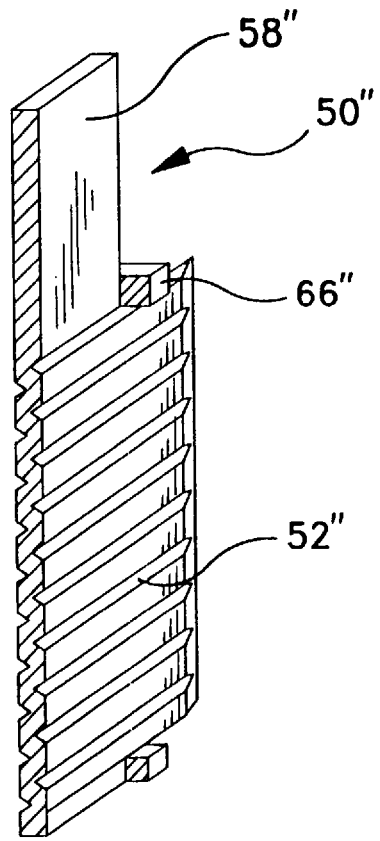
FIG. 6 is a prospective view of an alternative embodiment of the insert of the present invention.
Figure 6A:
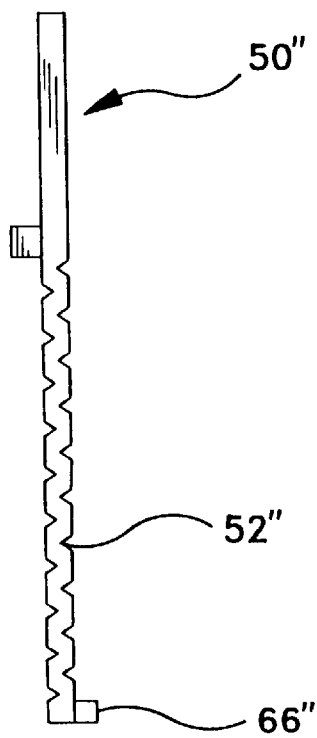
FIG. 6A is an elevational end view of the outside edge of the insert of FIG. 6.
Figure 6B:
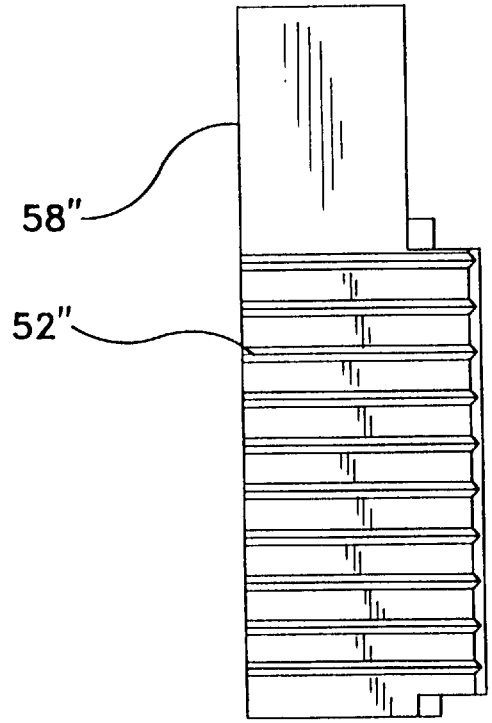
FIG. 6B is an elevational side view of the insert of FIG. 6.

Another alternative embodiment of a flow restricting insert of the present invention is shown in FIGS. 6–6B. In this embodiment, insert 50" is similar to that shown in FIGS. 5–5D except that the length of the grooved portion 51" and grooves 52" is longer than the radial distance between the outer and inner diameter of annular housing 42. By increasing the length of the grooves the amount of time the material is in contact with the heated insert is increased. This ability to vary the time of exposure to the heat of with the heated insert is increased. This ability to vary the time of exposure to the heat of the processing wall allows for various types of materials to be liquiflash processed and to further control the ultimate morphology of the reformed product. In addition, since the thermally conducting insert extends radially inwardly beyond annular wall 42 and into chamber 25, heat is channeled into the center of the chamber. This provides a more uniform heating of the feedstock material resulting in improved material processing.

Figure 7A:
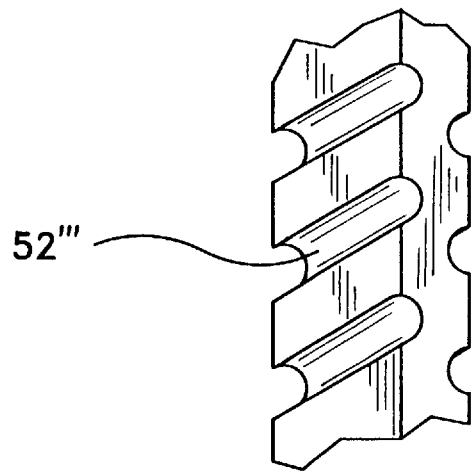
FIG. 7A is a partial perspective view of an alternative embodiment of the insert of the present invention having grooves U-shaped in cross-section.
Figure 7B:
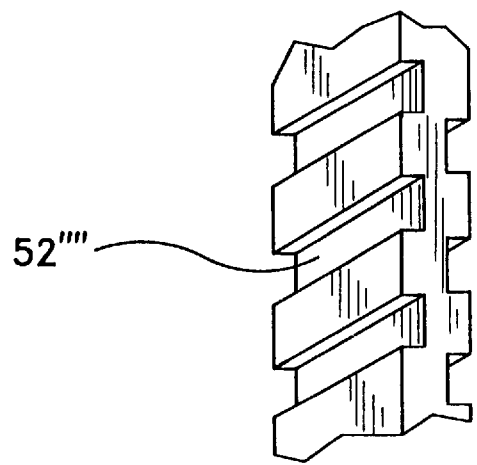
FIG. 7B is a partial perspective view of an alternative embodiment of the insert of the present invention having grooves square-shaped in cross-section.

While V-shaped grooves are shown and described herein, it is also within the contemplation of the present invention that the grooves may have a variety of cross-sectional shapes including U-shaped grooves 52''' as shown in FIG. 7A and square-shaped grooves 52'''' as shown in FIG. 7B.

Figure 8:
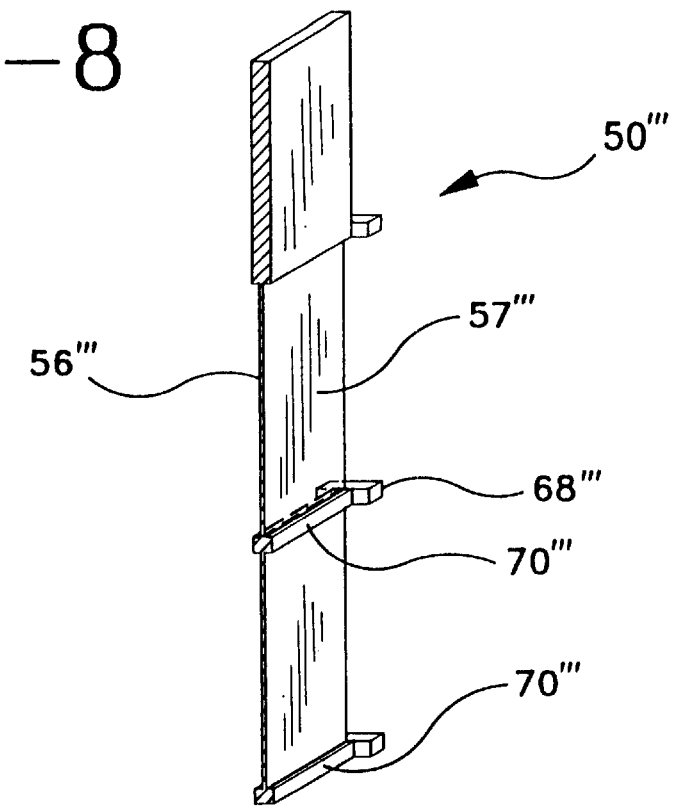
FIG. 8 is a prospective view of an alternative embodiment of the insert of the present invention.
Figure 8A:
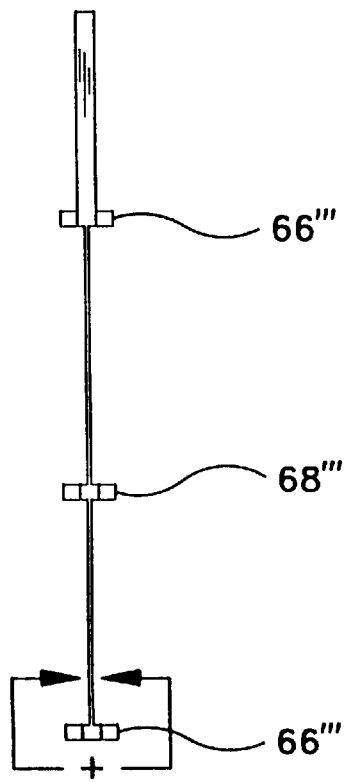
FIG. 8A is an elevational end view of the outside edge of the insert of FIG. 7.
Figure 8B:
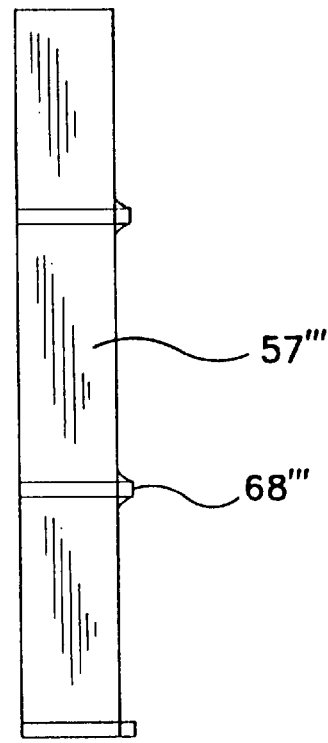
FIG. 8B is an elevational side view of the insert of FIG. 7.

The use of inserts of various shapes allows for the spinner head to also perform flash flow processing. Therefore, the spinner head is able to produce a variety of morphologies in addition to microspheres. An example of such an insert is shown in FIGS. 8B. In this embodiment, insert 50''' has sidewalls 56''', 57'' that are substantially smooth and planar. The side walls have a thickness, t, that is less than the width of slot 48. Insert 50''', therefore, divides slot 48 into two thinner slots, and therefore, changes the exit point from which feedstock material is expelled. Such a change in opening size results in a change in reformed morphology. In this embodiment, insert 50''' further includes a pair of intermediate latch member 68''' disposed substantially at the mid point of grooved portion 51''' in order to provide additional securement means and stability to the insert. Intermediate latch member 68''', and latch member 66''' formed on the lower portion of the insert are connected to members 70'' which extend substantially perpendicular to the longitudinal axis of insert 50'''. These members 70''' have a thickness substantially similar to slot 48 so that the abut the corresponding slot side wall when insert 50''' is inserted in slot 48.

The present invention therefore, allows for the geometry of the openings though which material is expelled, to be easily changed. This can be achieved by simply dropping in inserts which have a different groove configuration or other dimensional and cross-sectional variations.

The operation of the preferred embodiment shown in FIGS. 1–5 may now be described. A feedstock material such as sugar or sugar mixed with other materials, may be introduced into chamber 25 of spinner head 10 through funnel 22. Spinner head 10 is caused to rotate at a selected speed about the axis A—A by stem 26. The feedstock within spinner head 10 is propelled by centrifugal force directly against the cylindrical wall formed by the tubular heating elements 20, having been uniformly heated to a preselected temperature sufficient to provide proper processing conditions, heat the annular housing which in turn heat material projected thereagainst and cause the solid material to be reduced for processing in rapid fashion. The feedstock is then forced through the grooves 52 formed in inserts 50 to be propelled into the ambient atmosphere where it is reformed and solidified. Such propulsion causes physical changes in the spun product.

The use of annular housing assembly 40 is particularly beneficial in the manufacture of spun pharmaceutical product since the present invention is relatively easy to clean and maintain. The ability to throughly and effectively clean the processing components is especially important in pharmaceutical production. If a spinner head has been used to manufacture one type of pharmaceutical product and then is subsequently used to produce a different pharmaceutical product it is very important that traces of prior product not carry over into the subsequent product.

Proper cleaning of the spinner head has been especially difficult for devices producing microspheres. Typically, such shapes are formed by processing walls containing laser drilled holes. These holes are very difficult to clean and often become clogged with material which is not easily dislodged therefrom. The present invention overcomes these problems by use of a removable annular housing assembly having removable inserts.

As shown in FIGS. 1 and 2, annular housing assembly 40 constitutes the components which come in contact with the feedstock material. Therefore, when the head must be cleaned, the inserts may be quickly removed from slots 48 and cleaned separately from the annular housing. Annular housing 42 may also be easily removed from the head and properly cleaned in order to remove any residual material which is has adhered to the surfaces. Therefore, all components that contact the feedstock material can be removed and cleaned independently of the powered components such as the heaters and associated wiring. In addition, slots 48 are preferably spaced such that thorough cleaning of the slots can be done quickly and relatively easily. The slot size also allows for relatively simple visual inspection of the slots to ensure that the housing 42 is properly cleaned. Accordingly, the present invention eliminates small crevices that are difficult and time consuming to clean as well as being difficult to visually verify if proper cleaning has taken place.

In the present invention, once the various parts have been thoroughly cleaned, the assembly may be easily reassembled by attaching the annular housing to the head and dropping in inserts 50 into slots 48.

Figure 9:
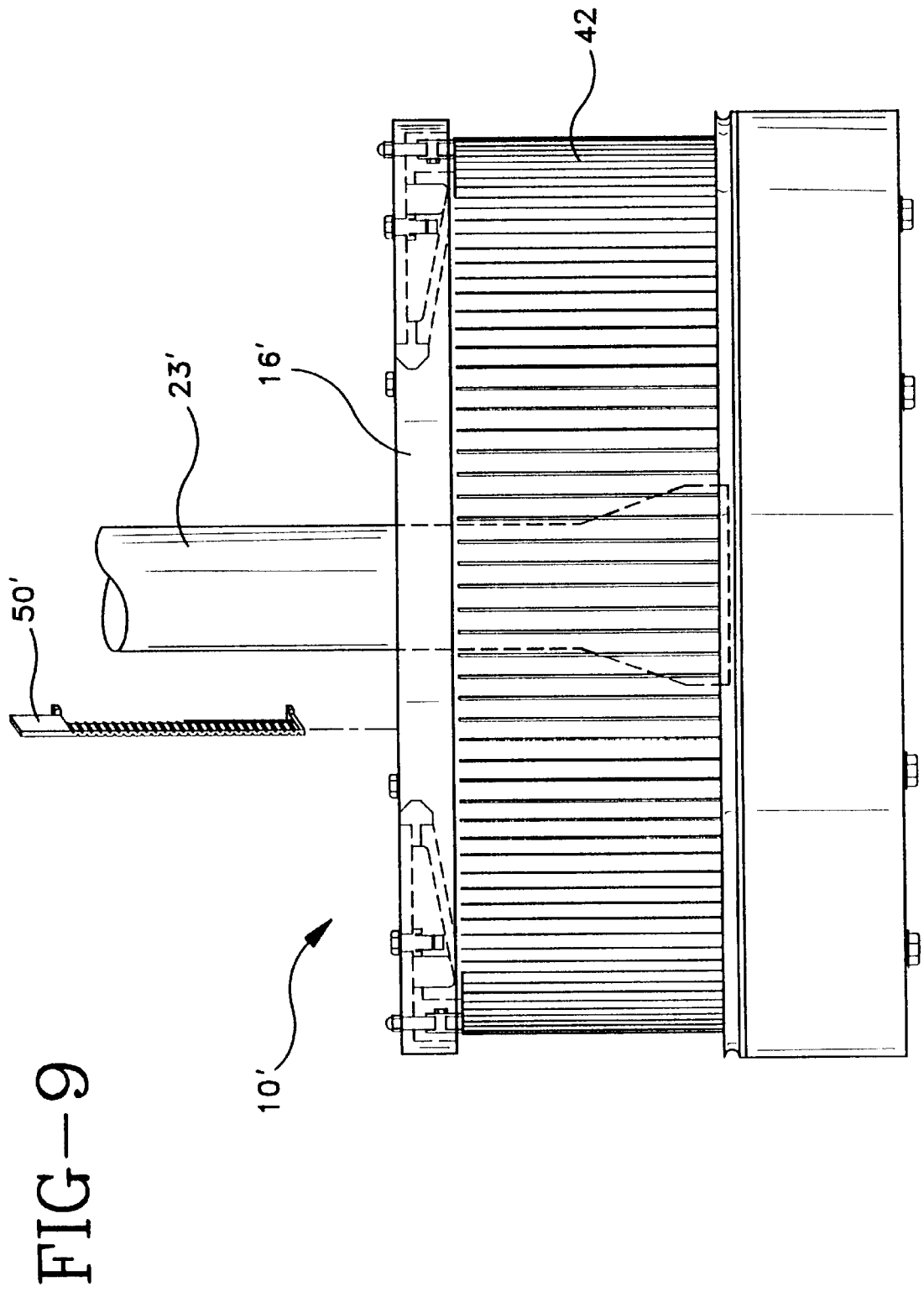
FIG. 9 is an elevational view of a further embodiment of the spinner head of the present invention.

The present invention may also be employed in the modified embodiment shown in FIG. 9. A spinner head 10' is designed for use in an inverted fashion, i.e. suspended from an overhead support (not shown). A support rod 23' supports spinner head 10' in an inverted fashion. A restricting plate 16' using in place of cover 16 supports the annular housing 42' on spinner head 10'. The inserts 50' of the type more fully shown in FIG. 5, may be inserted in a manner described above so as to be supported between restricting plate 16' and the lower portion of spinner head 10'.

Although the illustrative embodiments of the present invention have been described herein with reference to the accompanied drawings, it is to be understood that the invention is not limited to those precise embodiments, and that various other changes and modifications may be effected therein by one skilled in the art without departing from the scope or spirit of the invention.

What is claimed is:

1. A spinner head comprising:
   a base;
   a cover aligned with and spaced from said base;
   a plurality of discrete elongate spaced heating elements positioned between said base and said cover and defining a perimetrical configuration;
   said base, said cover and said heating elements mutually defining a chamber for accommodating therein a solid non-solubilized feedstock material capable of undergoing physical transformation with the application of heat and force; and
   restricting means for restricting expulsion of said feedstock material from said chamber, said restricting means including a plurality of plates, each plate being removably insertable longitudinally in a space between said heating elements.

2. A spinner head of claim 1 wherein said plate is a generally elongate member having two generally planar opposed sides.

3. A spinner head of claim 2 wherein at least one of said sides having a plurality of grooves through which feedstock material may be expelled.

4. A spinner head of claim 3 wherein said grooves extend generally perpendicular to the elongate plate and extend radially outwardly from said spinner head.

5. A spinner head of claim 4 wherein both of said plate sides include a plurality of grooves.

6. A spinner head of claim 5 wherein each of said grooves are substantially V-shaped in section.

7. A spinner head of claim 6 wherein each of said grooves are uniformly shaped and each groove has a varying depth, said depth growing more shallow as said groove extends radially outward.

8. A spinner head of claim 7 wherein each of said grooves has a varying width, and said width decreases as said groove extends radially outward.

9. A spinner head of claim 8 wherein said plate has an inside edge facing said chamber, said inside edge being beveled to a point in order to assist in channeling said feedstock material through said grooves.

10. A spinner head of claim 9 wherein said plate includes a tab extending upwardly from a top portion, said tab providing a gripping area for facilitating removal of said plate from said spinner head.

11. A spinner head of claim 2 wherein said restricting means further includes an elongate generally annular housing having an inside and outside diameter and having a plurality of circumferentially spaced passages extending therethrough, said housing being positionable over said heating elements with said tubular heating elements residing within said passages, said annular housing defining longitudinal radially-directed slots between said passages so as to permit passage of said feedstock material therethrough, and one of said flow restricting plates being insertable in each of said slots and engageable with said feedstock material as it is expelled.

12. A spinner head of claim 11 wherein said slots are defined by closely spaced slot walls extending between the miner and outer diameter of said annular housing and wherein said slot wall intimately receives said flow restricting plate.

13. A spinner head of claim 12 wherein said plate has a thickness substantially similar to said space between said slot walls.

14. A spinner head of claim 13 wherein said annular housing is formed of heat conductive material.

15. A spinner head of claim 11 wherein said grooves have a length greater than a radial distance between the outer and inner diameter or said annular housing.

16. A spinner head of claim 11 wherein said grooves have a length approximately less than half a radial distance between the outer and inner diameter or said annular housing.

17. A spinner head of claim 11 wherein each of said plates further includes means for securing said plate in said spinner head upon rotation thereof.

18. A spinner head of claim 17 wherein said plate securing means includes a latch member extending substantially orthogonally outwardly from at least one side of said plate and engageable with said annular housing such that upon rotation of said spinner head said plate is urged radially outwardly by centrifugal force and said latch member is urged against said annular housing thereby preventing said plate from being expelled from said slot.

19. A spinner head of claim 18 wherein said securing means includes two latch members one disposed on an upper end of said plate and one disposed on a lower end of said plate.

20. A spinner head of claim 19 wherein said latch members engage a portion of said annular housing adjacent said inner diameter thereof.

21. A spinner head of claim 20 wherein said plate has an inside edge, said inside edge facing said chamber upon insertion of said plate in said spinner head, said securing means being disposed adjacent to said inside edge of said plate.

22. A flow restricting device for a use in a spinner head having an annular slotted processing wall through which feedstock material is expellable from a central chamber comprising:

a substantially elongate plate having a pair of opposed sides, said plate being insertable in said slot, at least one of said plate sides including a plurality of radially extending grooves and, said grooves forming a pathway for said expelled feedstock material.

23. A flow restricting device of claim 22 wherein said grooves extend generally perpendicular to the elongate plate and extend radially outwardly from said spinner head.

24. A flow restricting device of claim 23 wherein both of said plate sides includes a plurality of grooves.

25. A flow restricting device of claim 24 wherein said grooves are substantially V-shaped in cross-section.

26. A flow restricting device of claim 25 wherein each of said grooves are uniformly shaped and each groove has a varying depth, said depth growing more shallow as said groove extends radially outward.

27. A flow restricting device of claim 26 wherein each of said grooves has a varying width, said width decreases as said groove extends radially outward.

28. A flow restricting device of claim 27 wherein said plate has an inside edge facing said chamber, said inside edge being beveled.

29. A flow restricting device of claim 27 wherein said plate includes a tab extending upwardly from a top portion, said tab providing a gripping area for facilitating removal of said plate from said spinner head.

30. A flow restricting device of claim 25 wherein each of said plates further includes means for securing said plate in said spinner head upon rotation thereof.

31. A flow restricting device of claim 30 wherein said plate securing means includes a latch member extending substantially orthogonally outwardly from at least one side of said plate and engageable with said annular, processing wall such that upon rotation of said spinner head said plate is urged radially outwardly by centrifugal force and said latch member is urged against said annular processing wall thereby preventing said plate from being expelled from said slot.

32. A flow restricting device for a use in a spinner head having an annular processing wall having longitudinal slots extending therethrough through which feedstock material is expellable comprising:

a plurality of substantially elongate plates each having a pair of opposed sides, one of said plates being insertable into each said slot, each said plate sides being substantially smooth and having a thickness less then the thickness of said slot whereby each said plate divides said slot longitudinally forming a reduced pathway for said expelled feedstock material on both sides of said plate.

33. A flow restricting device of claim 32 wherein each said plate includes means for securing said plate to said spinner head.

34. A method for restricting the flow of feedstock material through a spinner head having an annular slotted processing wall through which said feedstock is expelled, said method comprising:

providing a plurality of substantially elongate plates each having a pair of opposed sides, each said plate sides being substantially smooth and having a thickness less then the thickness of said slot whereby each said plate divides said slot longitudinally forming a reduced pathway for said expelled feedstock material on both sides of said plate;

inserting into each of said slots one of said substantially elongate plates.

35. The method of claim 34 wherein both of said elongate plate paired sides further comprise a plurality of grooves, said grooves forming a pathway for said expelled feedstock.

36. The method of claim 35 wherein each of said plurality of grooves are substantially V-shaped in section.

* * * * *